United States Patent
Martin et al.

(10) Patent No.: US 6,640,316 B1
(45) Date of Patent: Oct. 28, 2003

(54) BOOT RECOVERY OF SIMPLE BOOT BIOS

(75) Inventors: Todd R. Martin, Austin, TX (US); Dirie N. Herzi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/577,025

(22) Filed: May 23, 2000

(51) Int. Cl.$^7$ ................................................ G06F 11/00
(52) U.S. Cl. ............................ 714/36; 714/2; 714/25
(58) Field of Search ............................ 713/2; 714/21, 714/23, 24, 36, 25

(56) References Cited

U.S. PATENT DOCUMENTS

| | | | |
|---|---|---|---|
| 5,513,319 A | 4/1996 | Finch et al. ............ | 395/185.08 |
| 5,530,946 A | 6/1996 | Bouvier et al. ......... | 395/182.21 |
| 5,872,967 A | 2/1999 | DeRoo et al. ............... | 395/652 |
| 5,938,764 A | 8/1999 | Klein ............................ | 713/1 |
| 5,978,913 A | 11/1999 | Broyles et al. ................. | 713/2 |
| 6,098,158 A | 8/2000 | Lay et al. .................... | 711/162 |
| 6,101,617 A * | 8/2000 | Burckhartt et al. ........... | 714/23 |
| 6,212,651 B1 * | 4/2001 | Schieve et al. ............... | 714/36 |
| 6,282,641 B1 * | 8/2001 | Christensen .................... | 713/2 |
| 6,282,643 B1 * | 8/2001 | Cromer et al. .................. | 713/2 |
| 6,321,332 B1 * | 11/2001 | Nelson et al. .................. | 713/2 |
| 6,336,161 B1 * | 1/2002 | Watts .......................... | 711/103 |
| 6,356,965 B1 * | 3/2002 | Broyles et al. ............. | 710/104 |

OTHER PUBLICATIONS

Windows Galore, "Understanding Safe Mode", 1999, pp. 1–4, www.windowsgalore.com/windows.95/safemode.htm.*

Power Quest, "Solution: Massster Error List", 2002, pp. 1–15, www.powerquest.com/support/primus/id817.cfm.*

Microsoft Corp., "Simple Boot Flag Specification" Version 2, Mar. 26, 2003.

Microsoft; *Simple Boot Flag Specification: Version 1.0*; http://www.microsoft.com/hwdev/DESINIT/SIMP_BIO-S.HTM; Feb. 16, 2000; 5 pages. (Copy Enclosed).

Marc Alexander and Peter Woytovech; *Using RTC Wake–Up To Enable Recovery From Power Failures*; U.S. Ser. No.: 09/317,309; Filed May 24, 1999 (Copy Not Enclosed).

* cited by examiner

*Primary Examiner*—Nadeem Iqbal
*Assistant Examiner*—Timothy M. Bonura
(74) *Attorney, Agent, or Firm*—Hamilton & Terrile, LLP; Stephen A. Terrile

(57) ABSTRACT

A method, computer system, and apparatus perform a modified simple boot. Rather than following Ver. 1 of the Simple Boot Flag Specification, the simple boot flag is ignored if certain platform corruption errors are detected by the BIOS. When the simple boot flag is set, the BIOS runs through a set of core diagnostics to determine whether a platform corruption has occurred. If BIOS detects that the simple boot flag is set and that no platform corruptions have occurred, then a simple boot is performed. However, if a platform corruption is detected, the set simple boot flag is ignored and a full suite of diagnostics routines is performed by the BIOS during the boot process.

39 Claims, 3 Drawing Sheets

BOOT RECOVERY OF SIMPLE BOOT BIOS

BACKGROUND OF THE INVENTION

1. Field of the Invention

This invention relates generally to computer systems and, more particularly, to a modified simple-boot BIOS.

2. Description of the Related Art

Version 1.0 of the Simple Boot Flag Specification ("SBF Spec") by Microsoft, which is incorporated herein by reference in its entirety, provides for a simplified boot process that does not run diagnostics unless a problem is known to exist. The SBF Spec provides for a boot register that resides in complementary metal oxide semiconductor ("CMOS") memory and whose location is indicated by a boot table. The operating system writes to this boot register to set options for subsequent boots. The computer system's BASIC Input/Output System ("BIOS"), and the BIOS on any expansion cards, detect, by evaluating the contents of the boot register, whether diagnostics need to be executed during the next boot.

The boot register resides in CMOS memory and provides a mechanism for the operating system to communicate back to the BIOS about what actions need to be taken on the next boot. Specifically, the boot register contains a diagnostics bit, DIAG. The contents of the DIAG bit indicate to the BIOS whether or not Power On Self Test (POST) diagnostics should be run during boot-up. The DIAG bit is set either by the BIOS itself or by the operating system. If set by the operating system, the DIAG bit is set during one boot to indicate to the BIOS that diagnostics should be run during the next boot. If the DIAG bit is not set, then the BIOS should not run a full suite of diagnostic routines but should instead run a much simpler boot routine, referred to herein as a simple boot routine, in order to boot the computer system as quickly as possible.

The SBF Spec therefore seeks to speed up perceived boot time by specifying that the operating system perform some of the diagnostics routines traditionally performed by the BIOS. This scheme has the result that the BIOS skips, when the simple boot flag is set, many of the configuration and test routines that have traditionally been performed by the BIOS to ensure a stable working platform. Consequently, the operating system must detect potential failures and request that the BIOS run full diagnostics during the next boot. A drawback to this scheme is that certain corruptions may cause the operating system to crash before the BIOS has an opportunity to run full diagnostics during the next boot, causing a catastrophic condition of non-recovery. What is needed is a method and apparatus that allows the BIOS to override the simple boot flag when the BIOS detects certain potential platform corruptions.

SUMMARY OF THE INVENTION

A method, apparatus, and computer system provide for modified simple boot operations. Specifically, the BIOS ignores the "simple boot" value in a diagnostics indicator if any one of several platform corruptions have occurred. Rather than performing a simple boot under such circumstances, the BIOS performs a full POST routine that includes one or more diagnostics modules.

In one embodiment, a method for performing a boot for a computer system is provided. The method includes evaluating the contents of a diagnostics indicator, also referred to as a simple boot flag, to determine whether the indicator contains a "simple boot" value. In at least one embodiment, the "simple boot" value is equivalent to a "set" state. The method includes determining, if the diagnostics indicator is set, whether a platform corruption has occurred. If both (the simple boot flag is set) and (a platform corruption has not occurred) then a simple boot is performed. Otherwise (i.e., either the simple boot flag is not set or a platform corruption has occurred, or both) one or more diagnostic routines are executed.

In at least one embodiment, determining whether a platform corruption has occurred involves evaluating the state of various software and hardware flags. If a flag is set, then it is determined that a platform error has occurred. Various embodiments determine whether various types of platform errors have occurred, including a user setup change, a BIOS change, a chassis intrusion, a power loss, a CMOS corruption, a thermal error, a fan error, a smart error, a memory error, a voltage error, and a voltage regulator error.

Another embodiment provides a computer system that performs the method described above. In at least one embodiment, the computer system includes a processor, a BIOS memory, and battery-backed CMOS system startup memory. The BIOS modules are installed in the BIOS memory. The simple boot flag resides in the system startup memory.

Another embodiment provides a BIOS that performs the method described above. The BIOS includes a BIOS memory, the BIOS memory being loaded with modules that perform the method described above.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
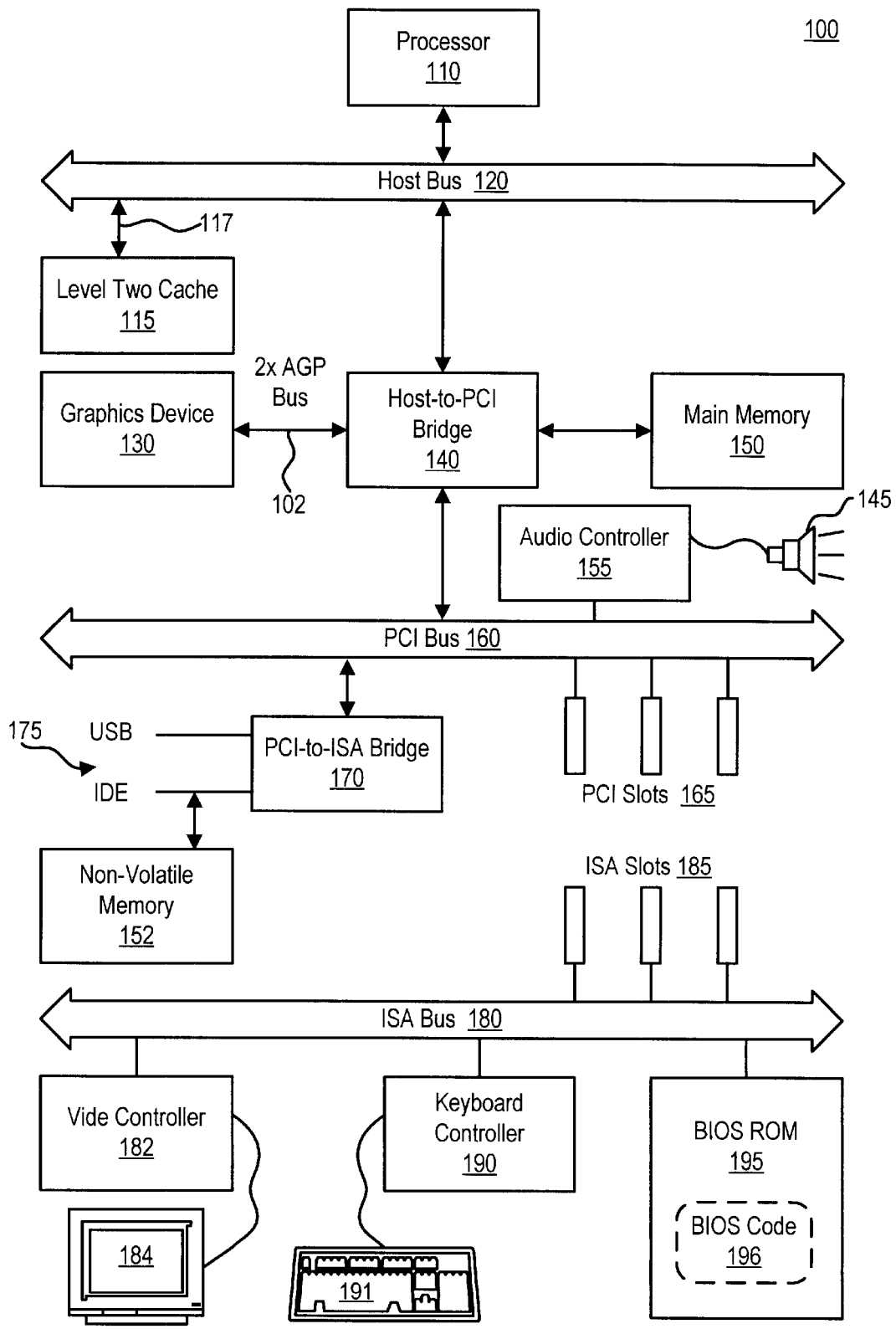
FIG. 1 is block diagram illustrating an exemplary computer system.

FIG. 1 is a block diagram of an exemplary computer system 100. The computer system 100 may be found in many forms including, for example, mainframes, minicomputers, workstations, servers, personal computers, internet terminals, notebooks and embedded systems. Personal computer (PC) systems, such as those compatible with the x86 configuration, include desktop, floor standing, or portable versions. A typical PC computer system 100 is a microcomputer that includes a microprocessor (or simply "processor") 110, associated main memory 150 and control logic and a number of peripheral devices that provide input and output for the system 100. A typical computer system 100 may also include a cache 115 to facilitate quicker access between the processor 110 and main memory 150. The peripheral devices often include speaker systems 145, keyboards 191, and traditional I/O devices that often include display monitors 184, mouse-type input devices, floppy disk drives, hard disk drives 152, CD-ROM drives, modems, and printers. A typical computer system also includes a BIOS memory 195 on which the software modules known as the Basic Input/Output System (BIOS) 196 are stored. The BIOS memory is a non-volatile memory, such as ROM or flash memory. The number of I/O devices 187 being added to personal computer systems continues to grow. For example, many computer systems also include network capability, terminal devices, televisions, sound devices, voice recognition devices, electronic pen devices, and mass storage devices such as tape drives, CD-R drives or DVDs. The peripheral devices usually communicate with the processor over one or more buses 120, 160, 180, with the buses communicating with each other through the use of one or more bridges 140, 170.

One skilled in the art will recognize that the foregoing components and devices are used as examples for sake of conceptual clarity and that various configuration modifications are common. For example, the audio controller 155 is connected to the PCI bus 160 in FIG. 1, but may be connected to the ISA bus 180 or other appropriate I/O buses in alternative embodiments. As further example, processor 110 is used as an exemplar of any general processing unit, including but not limited to multiprocessor units; host bus 120 is used as an exemplar of any processing bus, including but not limited to multiprocessor buses; PCI bus 160 is used as an exemplar of any input-output devices attached to any I/O bus; AGP bus 102 is used as an exemplar of any graphics bus; graphics device 130 is used as an exemplar of any graphics controller; and host-to-PCI bridge 140 and PCI-to-ISA bridge 170 are used as exemplars of any type of bridge. Consequently, as used herein the specific exemplars set forth in FIG. 1 are intended to be representative of their more general classes. In general, use of any specific exemplar herein is also intended to be representative of its class, and the non-inclusion of such specific devices in the foregoing list should not be taken as indicating that limitation is desired.

The machine-executed method of the present invention may be performed by one or more executable computer software module(s) 196 contained in BIOS memory 195. Actual implementation of such computer code might be executable, for example, on a Dell PC based on the Intel 80.times.86 or Pentium™ microprocessors, or on other suitable processor-based computer systems. The BIOS code 196 (sometimes referred to herein simply as "the BIOS") contains, among other things, software modules, or "routines", that test the computer system 100. These diagnostics routines, sometimes collectively referred to as the Power On Self Test ("POST"), typically execute when power is supplied the computer system 100.

During the POST diagnostics routines, the BIOS 196 runs through all the known components of the computer system 100—such as the processor 110, the memory 150, the keyboard 191, and so on—to test and determine whether they are operating properly. If the BIOS diagnostics run properly, the BIOS code 196 then begins executing the Initial Program Load ("IPL"). The IPL begins the process of transferring control of the computer system 100 from the BIOS code 196 to the operating system.

Typically, the general trend has been for the operating system to take over BIOS functions. One reason for this is to allow the end user of the computer system 100 to perceive less delay, when booting up the computer system 100, before the operating system takes over. For instance, the Simple Boot Flag Specification, discussed above, provides for the operating system to take over many of the POST diagnostics tasks traditionally performed by the BIOS. Another example of allowing the operating system to take over BIOS functions is the OnNow initiative, inspired by Microsoft, Inc., which seeks to minimize the delays inherent in starting up and shutting down a personal computer system, and also seeks to let the computer system 100 run while it appears to be off and to lower the overall power requirement of the computer system 100. In order to facilitate power management functions, an integral part of the OnNow initiative is the Advanced Configuration and Power Interface ("ACPI") standard developed jointly by Intel, Microsoft, and Toshiba.

Figure 2:
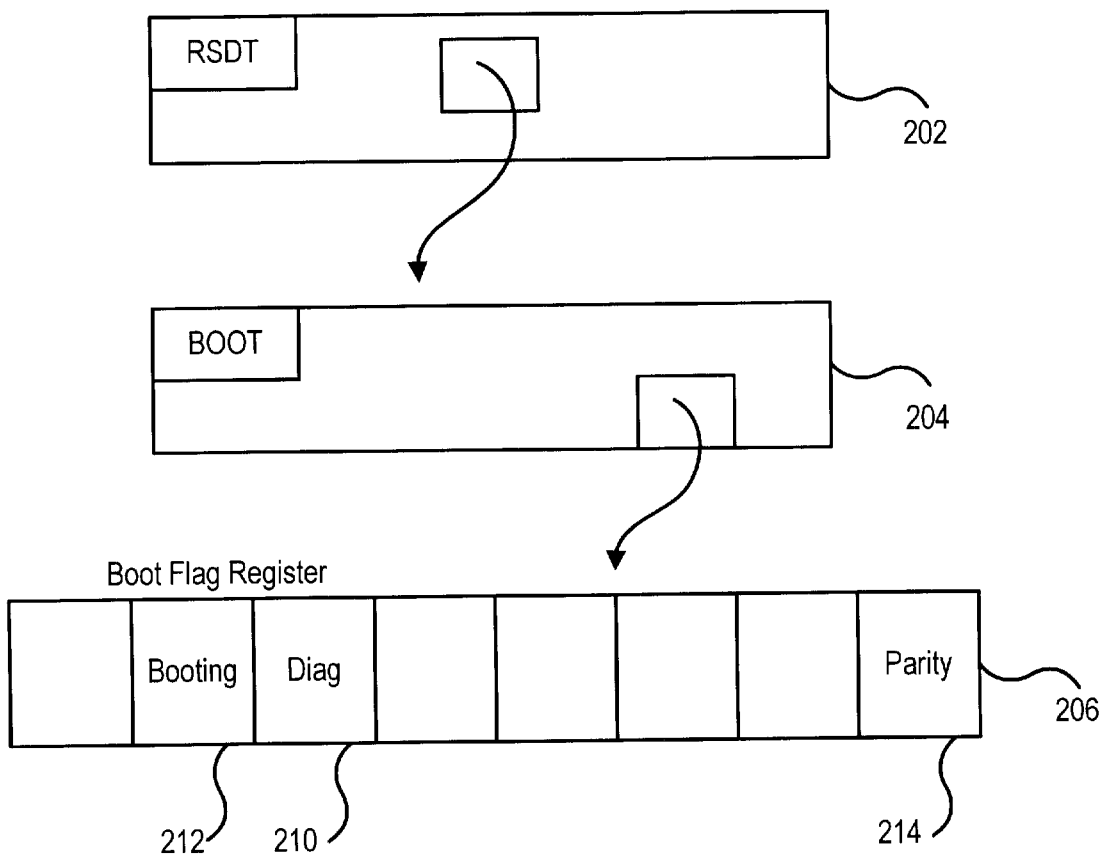
FIG. 2 is a block diagram illustrating a hierarchy of data structures including an ACPI RSDT table, a boot table, and a boot register.

FIG. 2 illustrates that, in order to perform its power management function, ACPI must manage a large amount of data. ACPI stores this information in a hierarchy of tables. The overall master table is called the Root System Description Table ("RSDT") 202. The RSDT 202 has no fixed place in memory. Rather, the BIOS 196 locates a pointer to the RSDT table 202 during the memory scan that is part of the boot-up process. The RSDT table 202 itself is defined in memory because it starts with the signature of "RSDT". Following the signature is an array of pointers that indicate the location of other description tables. The SBF spec specifies that one of these tables is called the Boot Table 204.

The Boot table 204 indicates the location of a register, the "boot flag register" 206, used by the BIOS in its performance of the functions specified in the Simple Boot Flag Specification. The boot flag register 206 is a register in the system startup memory 197. The system startup memory 197 is a non-volatile memory containing vital setup information used by the BIOS 196. In at least one embodiment, the system startup memory 197 is a special, small block of battery-backed complementary metal oxide semiconductor ("CMOS") memory. Because CMOS memory is volatile, the battery keeps the system startup memory 197 fresh.

Although the CMOS that holds the system startup memory 197, including the boot flag register 206, is conventional memory, it is not in direct reach of the processor 110 because the system startup memory 197 is I/O mapped. That is, the contents of the boot flag register 206 are accessed through two input/output ports. In an Intel Architecture platform, the system startup memory 197 is accessed through ports 70$h$ and 71$h$.

The Simple Boot Flag Specification uses the boot flag register to allow the operating system to notify the BIOS when a failure has occurred and thus determine that diagnostic routines need to be executed during the next boot. The goal of this scheme is to run time-consuming BIOS diagnostic routines only when a problem arises, rather than running them a majority of the time. The operating system of the computer system 100 writes to the boot flag register 206 to set options for subsequent boots. The BIOS code 196 reads from the boot flag register 206 during subsequent execution of its boot routine to determine what actions to take. In this manner, an operating system uses the boot flag register 206 to communicate boot options to the BIOS 196. This allows the BIOS 196 to determine whether to run diagnostic tests during boot-up. This scheme is based on the observation that much of boot time is spent running the POST diagnostic routines, and on the further observation that it is not necessary to run these diagnostic routines during every boot-up because modern hardware implementations rarely fail.

The SBF Spec specifies that the operating system utilize the boot register 206 to communicate to the BIOS regarding actions to be taken during the next boot. The format of the boot register 206 is set forth below in Table 1:

TABLE 1

| Bit | Name | Description |
|-----|------|-------------|
| 0 | PNPOS | Indicates that a Plug-and-Play capable operating system is installed on the computer system. |
| 1 | BOOTING | Indicates whether or not the previous boot was completed. |
| 2 | DIAG | Indicates whether or not the BIOS should run full diagnostics. |
| 3–6 | Reserved | Must be 0. |
| 7 | PARITY | Used to check the integrity of the boot register. |

The BOOTING indicator 212 and the DIAG indicator 210 are of particular interest when discussing the present invention. The SBF Spec specifies that the BOOTING indicator 212 is reset by the operating system to indicate when the computer system has successfully booted. The BOOTING indicator 212 is read by the computer system BIOS 196 and the BIOS on any expansion cards to detect failure of a previous boot. The SBF Spec specifies that the system BIOS must check the state of the BOOTING indicator 212 at the beginning of POST. If the BOOTING indicator 212 is in a first state (i.e., it is set), then the system BIOS code 196 sets the DIAG indicator 210 to a first state (i.e., sets the diagnostics indicator 210) to indicate that a full suite of diagnostics routines must be run.

The BOOTING indicator 212 must be set by the BIOS 196 at the earliest possible moment of POST during the current boot. Accordingly, at the earliest possible point in POST, the system BIOS 196 reads the initial values of the BOOTING indicator 212 and the DIAG indicator 210 (Step 1) as configured by the previous boot. The system BIOS 196 then sets the BOOTING indicator to the first state. In at least one embodiment, this sets the BOOTING indicator 212 to a logical value of 1b'1'. The result of this operation is that the BIOS 196 determines, in Step 1, the values of the BOOTING indicator 212 and the DIAG indicator 210 from the previous boot; the BIOS 196 also indicates, by setting the BOOTING indicator 212, that a current boot has begun.

The diagnostics indicator, DIAG 210, indicates whether or not the system BIOS 196, expansion card BIOSes, and the operating system should, according to the SBF Spec, run diagnostics. If the initial values of the BOOTING 212 or DIAG 210 indicators are determined in Step 1 to be set, then the system BIOS 196 sets the DIAG indicator 210. Otherwise, if both the BOOTING indicator 212 and DIAG indicator 210 are determined to be reset in Step 1, then the system BIOS 196 resets the DIAG indicator 210.

If the DIAG indicator 210 is set, then the system BIOS and the BIOS routines on any expansion cards run full POST diagnostics. Otherwise, if the DIAG indicator 210 is reset, then system BIOS and any expansion card BIOSes skip their diagnostics.

Thereafter, the IPL is executed. If the DIAG indicator 210 is set, the operating system may run its own suite of diagnostic routines. The BOOTING indicator 212 must be cleared by the operating system after the operating system has completed its boot procedure. Accordingly, when the operating system has completed booting, it clears both the BOOTING indicator 212 and the DIAG indicator 210. The operating system also sets the PNPOS and parity bits to the appropriate values at this time.

TABLE 2

| Initial Values (from previous boot) | | Values set by BIOS (for use on current boot) | | |
|---|---|---|---|---|
| BOOTING | DIAG | BOOTING | DIAG | Scenario Description |
| 0 | 0 | 1 | 0 | Previous boot was successful; Skip diagnostics on current boot. |
| 1 | 0 | 1 | 1 | Previous boot unsuccessful (BOOTING never cleared); Run diagnostics on current boot. |
| 0 | 1 | 1 | 1 | Previous boot was successful, but operating system found a problem and requested a diagnostic boot; Run diagnostics on current boot. |
| 1 | 1 | 1 | 1 | The previous boot was unsuccessful and was attempting run diagnostics (i.e., problems with previous two boots); Run diagnostics on current boot. |
| Corrupted | Corrupted | 1 | 1 | PARITY bit indicates the boot register 206 was corrupted; Run diagnostics on current boot. |

The foregoing discussion, which is summarized in Table 2 above, indicates that the Simple Boot Flag Specification specifies that the BOOTING indicator 212 will remain in the first state (set) if the operating system's boot process is interrupted due to a system failure. Conversely, in normal operation with no boot failures, the BOOTING indicator 212 will be in the second (reset) state during the Step 1 evaluation (because it was cleared by the operating system at the end of the previous boot). The DIAG indicator 210 will therefore be reset by the BIOS, and the computer system 100 will boot relatively quickly because no diagnostics will be performed during the current boot. A problem arises with this scheme, however, if the operating system encounters an unrecoverable error with the operating platform before the BIOS has a chance to run diagnostics during the next boot.

Figure 3:
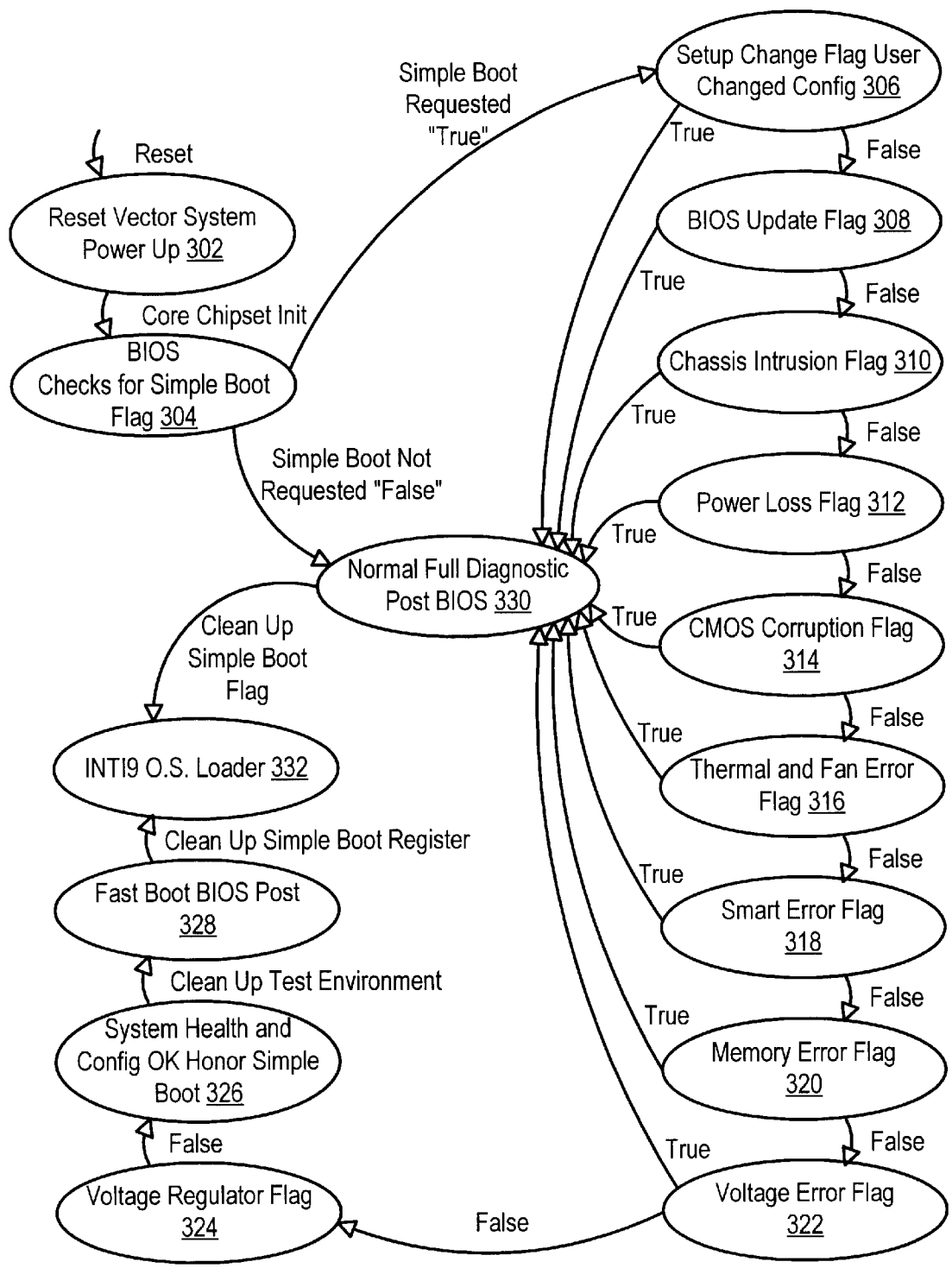
FIG. 3 is a state diagram illustrating a method of overriding a simple boot diagnostics indicator.

FIG. 3 is a state diagram illustrating a method of augmenting the operation described in the SBF Spec. In particular, the present invention provides that diagnostics are performed by the BIOS, even though the DIAG indicator 210 may be reset, when the BIOS detects certain platform corruptions.

FIGS. 1 and 3 illustrates that a reset event puts the computer system 100 into a reset state 302. One skilled in the art will realize that a reset event is any event that cycles the computer system 100 into a powered-on state. The reset event may be an initial supply of power to a computer system 100 that has been previously in a powered-off state, may be a user-initiated activation of a reset switch, may be a power cycle where power is removed and then restored to a computer system by a user or through an interruption of the power source, may be a software-initiated reset by the operating system, or any other event that causes, or emulates, the computer system's power transitioning from an "off" to "on" state.

FIGS. 1, 2 and 3 illustrate that, when a reset event occurs, certain hardware initialization occurs in the core chipset during the reset state 302. After core chipset initialization occurs, the computer system transitions from the reset state 302 to state 304, where the BIOS begins boot processing. In state 304, the BIOS 196 evaluates the contents of the parity bit 214. If the parity bit 214 contains an odd parity value, then the BIOS 196 evaluates the contents of the diagnostics indicator, DIAG 210. The diagnostics indicator 210 is sometimes referred to herein as the "simple boot flag." FIG. 3 illustrates that, if the diagnostics indicator contains a value indicating "false", or if the parity bit 214 does not contain an odd parity value, then the BIOS 196 runs a full suite of POST diagnostics routines in state 330. In at least one embodiment, a "false" value in the DIAG indicator 210 is equivalent to a reset state and indicates that a simple boot has not been requested by the operating system.

On the other hand, if the BIOS determines in state 304 that the parity bit 214 contains an odd parity value and that the diagnostics indicator 210 contains a value indicating that a simple boot should be run (i.e., a "simple boot" value), then the BIOS 196 transitions to state 306. In at least one embodiment, the simple boot value is the equivalent of a set state, which is represented as a 1b'1' value in Table 2. FIG. 3 illustrates that, if the diagnostics indicator contains the simple boot value (i.e., is set), then the processing of the present invention diverges from that specified in the SBF Spec. Specifically, rather than directly running the abbreviated simple boot routine in state 328, the BIOS instead performs a series of determinations in states 306 through 326 in order to detect platform corruptions. If a platform corruption is detected, the BIOS 196 overrides the simple boot value in the diagnostics indicator 210 and instead performs a full suite of diagnostics routines in state 330. (Each of the platform corruption detection states 306 through 326 is discussed separately below). After the BIOS 196 runs a full suite of diagnostic routines in state 330, the BIOS 196 sets the DIAG indicator 210 before transitioning from state 330 to state 332. This will inform the operating system that, even though the DIAG indicator 210 may have been reset at the beginning of the BIOS routines, the simple boot flag 210 was overridden. In this manner the operating system is notified that it may be appropriate for the operating system to run diagnostics after it assumes control. The BIOS then transitions to state 332, where the IPL is executed and control of the computer system 100 is relinquished to the operating system.

In state 306, the BIOS determines the state of a setup change flag. If the setup change flag is set, then the BIOS 196 determines that a user setup change has occurred. For instance, the user may have made system configuration changes using a configuration utility provided by the BIOS 196. If a user setup change has occurred, the BIOS transitions to state 330 and performs a full suite of diagnostic routines.

Otherwise, the BIOS 196 transitions to state 308, where it evaluates the contents of a BIOS update flag. The BIOS update flag is set when a change to the BIOS software 196 has been installed on the computer system. For instance, BIOS software 196 containing a bug fix or feature enhancement may be installed by the end user of the computer system 100. FIG. 3 illustrates that, if the BIOS update flag is set, then the BIOS determines that a BIOS change has occurred and transitions to state 330 in order to perform a full suite of diagnostic routines.

Otherwise, the BIOS 196 transitions to state 310, where it evaluates the contents of a chassis intrusion flag. In contrast to the two software flags mentioned above, the setup change flag and the BIOS update flag, the chassis intrusion flag is based on a hardware bit. The chassis intrusion flag is a software flag that is set when the chassis of the computer system has been opened, indicating a system management event. Opening of the chassis causes a hardware bit to be set to a set state, indicating that a chassis intrusion has occurred. This hardware switch is latched in software. If the BIOS 196 determines in state 310 that a chassis intrusion has occurred, the BIOS transitions to state 330 in order to perform a full suite of diagnostic routines.

Otherwise, the BIOS 196 transitions to state 312, where it evaluates the contents of a power loss flag. If the power loss flag is set, the BIOS 196 determines that a power loss has occurred. The power loss flag is a hardware flag that gets set when an unexpected change in the power voltage occurs in the computer system. For instance, the power loss flag is set when a voltage spike occurs. Such spikes can damage hardware, and a full suite of diagnostic routines should therefore be executed. Accordingly, if the power loss flag is set, the BIOS transitions to state 330.

Otherwise, the BIOS 196 transitions to state 314, where it evaluates the state of a CMOS corruption flag. If the CMOS corruption flag is set, the BIO 196 determines that the battery-backed CMOS system startup memory 197 been corrupted. For instance, if an unexpected write operation to the system startup memory 197 has occurred, the CMOS corruption flag will be set. In such case, the BIOS 196 transitions to state 330 in order to execute a full suite of diagnostic routines.

Otherwise, the BIOS 196 transitions to state 316, where it evaluates the contents of a thermal flag and a fan error software flag. If the thermal flag is set, the BIOS 196 determines that a thermal error has occurred. The thermal flag is set based on the input of several temperature probes that are placed in critical locations within the computer system 100. For instance, temperature probes are placed in close proximity to components of the computer system 100 that are particularly heat sensitive, such as the processor 110. If the probe determines that the temperature near the heat-sensitive component is out of tolerance, the thermal flag is set, causing a system management interrupt. In such instance, the computer system 100 is shut down due to potential overheating.

In state 316, the BIOS 196 also determines whether a fan error has occurred by evaluating the contents of a fan error flag. A fan inside the chassis of the computer system 100 draws cool air over the heat-critical components of the computer system 100. If this fan malfunctions, then the fan error software flag is set. If either the thermal flag or the fan error flag is set, the BIOS 196 transitions from state 316 to state 330, where it performs a full suite of diagnostic routines.

Otherwise, the BIOS 196 transitions to state 318, where it evaluates the contents of a smart error flag. If the smart error flag is set, the BIOS 196 determines that a smart error has occurred. The smart error flag is a software flag that is set by the intelligent controller on a hard disk drive 152 when an error occurs with a memory read or memory write operation. If the smart error flag is set, the BIOS 196 transitions to state 330 in order to perform a full suite of diagnostic routines.

Otherwise, the BIOS 196 transitions to state 320, where it evaluates the contents of a memory error flag. If the memory error flag is set, the BIOS 196 determines that a memory error has occurred. For instance, when a memory implemented in an Error Correction Code (ECC) chip detects and repairs a one-bit error, the memory error flag is set. In other embodiments, the memory error flag is set when a parity error is detected in main memory 150. Even if an ECC memory corrects an error, there is reason to run full diagnostics and determine that no further problems exist. If the memory error flag is set, the BIOS 196 therefore transitions to state 330 in order to perform a full suite of diagnostic routines.

Otherwise, the BIOS transitions to state 322, where it evaluates the state of a voltage error flag. If the voltage error flag is set, the BIOS 196 determines that a voltage error has occurred. This type of error does not necessarily mean that the entire power supply is faulty. Instead, the voltage error flag is set when one of the power planes in a computer system 110 is out of its acceptable voltage tolerance. Such fluctuations can damage chips and other subsystems. In some instances, a "true" or set value in the voltage error flag could indicate that the voltage regulator is malfunctioning. Accordingly, when the voltage error flag is set, the BIOS 196 transitions to state 330 in order to execute a full suite of diagnostic routines.

Otherwise, the BIOS 196 transitions to state 324, where it evaluates the contents of a voltage regulator flag. If the voltage regulator flag is set, the BIOS 196 determines that a voltage regulator error has occurred. A voltage regulator in a computer system is designed to protect the computer system 100 from undervoltages by keeping varying voltages within the range of voltages that run the computer system 100. In at least one embodiment, a main power plane in the computer system has its own voltage regulator—the power plane that powers the processor 110. This plane is designed to provide very little power fluctuations (i.e., very little tolerance) and provide very little noise to the processor 110. If the voltage regulator ceases operating, the allowed tolerances on this power plane are in danger of being violated. Therefore, if the BIOS 196 determines that a voltage regulator error has occurred, it transitions to state 330 in order to execute a full suite of diagnostic routines.

If the BIOS 196 traverses all of the corruption detection states 306 through 324 without detecting that a platform corruption has occurred, then the BIOS 196 transitions to a system healthy state 326. From this state 326, the BIOS 196 may safely perform the simple boot as requested by the operating system. The BIOS 196, in the system healthy state 326, performs certain clean-up operations in order to clean up the test environment. For instance, the BIOS 196 clears any memory buffers that may have been polluted during execution of the corruption detection states 306 through 324.

After the BIOS 196 has determined that all the corruption flags evaluate to "false" (i.e., are in a reset state) and has executed the clean-up operations, then the BIOS 196 transitions from the system healthy state 326 to state 328, where the BIOS 196 performs a simple boot. One skilled in the art will realize that the simple boot performed in state 328 is a subset of the operations performed in the full diagnostics state 330, and that the two states 328, 330 have been represented separately in FIG. 3 only for clarity.

FIGS. 2 and 3 illustrates that, after the simple boot state 228, the BIOS 196 cleans up the simple boot register 206 before transitioning to state 332. During this clean-up operation, the parity bit 214 and PNPOS bit of the boot flag register 206 are reset. A concern associated with the transition from state 328 to state 332 is that the BIOS 196 have a reliable way to determine the validity of the simple boot flag 210 if the simple boot flag 210 contains a reset value for two successive reset events. As illustrated in Table 1, above, the SBF spec defines that the only valid value for the parity bit of the boot flag register 206 is an odd parity value. During transition from state 328 to 332, the BIOS 196 sets the parity bit to an even value. During normal operation, the operating system resets the parity bit 214 to an odd parity value during each boot. If the operating system fails to set the parity bit 214 to an odd parity value, then the BIOS ignores a reset simple boot flag 210 during the next boot.

In state 332, the BIOS performs the IPL and transfers control to the operating system.

It is noted that all of the elements of the PC shown in FIG. 1 and FIG. 2 may not be necessary to understand the operation of the present invention. Further, in some instances, other elements which are necessary have been omitted for simplicity. In other instances, certain elements of a computer system unnecessary to understand the present invention have nonetheless been included to provide a more complete overview of the entire computer system in which the method of the present invention might be performed. Those of skill in the art will recognize that, based upon the teachings herein, several modifications may be made to the embodiments shown in FIGS. 1–3. For example, one skilled in the art will recognize that the corruption detection states 306 through 324 need not necessarily be performed in the exact order represented in FIG. 3. Indeed, the corruption detection states 306 through 324 may be performed in any order in relation to each other. One skilled in the art will also recognize that various diagnostics routines performed in state 330 need not be logically distinct routines. Therefore, execution of full diagnostics in state 330 involves execution of at least one diagnostic routine.

Also, for example, one skilled in the art will recognize that the BIOS modules described herein need not necessarily be implemented as software modules. The modules may, instead, be implemented as hardware modules or as a combination of hardware and software modules.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method for performing a boot for a computer system, comprising:
    evaluating the contents of a diagnostics indicator to determine whether the diagnostics indicator contains a simple boot value;
    if the diagnostics indicator contains the simple boot value, determining whether at least one platform corruption has occurred;
    if the diagnostics indicator contains the simple boot value and the at least one platform corruption has not occurred, executing a simple boot routine; and
    otherwise, executing at least one diagnostic routine.

2. The method of claim 1, wherein the determining whether at least one platform corruption has occurred further comprises determining whether a user setup change has occurred.

3. The method of claim 1, wherein the determining whether at least one platform corruption has occurred further comprises determining whether a basic input/output system change has occurred.

4. The method of claim 1, wherein the determining whether at least one platform corruption has occurred further comprises determining whether a chassis intrusion has occurred.

5. The method of claim 1, wherein the determining whether at least one platform corruption has occurred further comprises determining whether a power loss has occurred.

6. The method of claim 1, wherein the determining whether at least one platform corruption has occurred further comprises determining whether a CMOS corruption has occurred.

7. The method of claim 1, wherein the determining whether at least one platform corruption has occurred further comprises determining whether a thermal error has occurred.

8. The method of claim 1, wherein the determining whether at least one platform corruption has occurred further comprises determining whether a fan error has occurred.

9. The method of claim 1, wherein the determining whether at least one platform corruption has occurred further comprises determining whether a smart error has occurred.

10. The method of claim 1, wherein the determining whether at least one platform corruption has occurred further comprises determining whether a memory error has occurred.

11. The method of claim 1, wherein the determining whether at least one platform corruption has occurred further comprises determining whether a voltage error has occurred.

12. The method of claim 1, wherein the determining whether at least one platform corruption has occurred further comprises determining whether a voltage regulator error has occurred.

13. The method of claim 1, wherein the evaluating the value of diagnostics indicator further comprises retrieving the contents of the diagnostics indicator from a boot register.

14. A computer system that performs a simple boot, comprising:
   a processor;
   a system startup memory coupled to the processor; and
   a basic input/output system (BIOS) memory coupled to the processor, the BIOS memory including:
      a module that evaluates the contents of a diagnostics indicator to determine whether the diagnostics indicator contains a simple boot value;
      a module that determines, if the diagnostics indicator contains the simple boot value, whether at least one platform corruption has occurred;
      a module that executes, if the diagnostics indicator contains the simple boot value and the at least one platform corruption has not occurred, a simple boot routine; and
      a module that otherwise executes at least one diagnostic routine.

15. The computer system of claim 14, wherein the module that determines whether at least one platform corruption has occurred further determines whether a user setup change has occurred.

16. The computer system of claim 14, wherein the module that determines whether at least one platform corruption has occurred further determines whether a BIOS change has occurred.

17. The computer system of claim 14, wherein the module that determines whether at least one platform corruption has occurred further determines whether a chassis intrusion has occurred.

18. The computer systems of claim 14, wherein the module that determines whether at least one platform corruption has occurred further determines whether a power loss has occurred.

19. The computer system of claim 14, wherein the module that determines whether at least one platform corruption has occurred further determines whether a CMOS corruption has occurred.

20. The computer system of claim 14, wherein the module that determines whether at least one platform corruption has occurred further determines whether a thermal error occurred.

21. The computer system of claim 14, wherein the module that determines whether at least one platform corruption has occurred further determines whether a fan error has occurred.

22. The computer system of claim 14, wherein the module that determines whether at least one platform corruption has occurred further determines whether a smart error has occurred.

23. The computer system of claim 14, wherein the module that determines whether at least one platform corruption has occurred further determines whether a memory error has occurred.

24. The computer system of claim 14, wherein the module that determines whether at least one platform corruption has occurred further determines whether a voltage error has occurred.

25. The computer system of claim 14, wherein the module that determines whether at least one platform corruption has occurred further determines whether a voltage regulator has occurred.

26. The computer system of claim 14, wherein the module that evaluates the contents of a diagnostics indicator further comprises a module that retrieves the contents of the diagnostics indicator from a boot register.

27. An apparatus that performs a simple boot, comprising:
   a basic input/output system (BIOS) memory loaded with instructions for:
   evaluating the contents of a diagnostics indicator to determine whether the diagnostics indicator contains a simple boot value;
   if the diagnostics indicator contains the simple boot value, determining whether at least one platform corruption has occurred;
   if the diagnostics indicator contains the simple boot value and the at least one platform corruption has not occurred, executing a simple boot routine; and
   otherwise, executing at least one diagnostic routine.

28. The apparatus of claim 27, wherein the instructions for determining whether at least one platform corruption has occurred further includes instructions for determining whether a user setup change has occurred.

29. The apparatus of claim 27, wherein the instruction for determining whether at least one platform corruption has occurred further includes instructions for determining whether a BIOS change has occurred.

30. The apparatus of claim 27, wherein the instructions for determining whether at least one platform corruption has occurred further includes instructions for determining whether a chassis intrusion has occurred.

31. The apparatus of claim 27, wherein the instructions for determining whether at least one platform corruption has occurred further includes instructions for determining whether a power loss has occurred.

32. The apparatus of claim 27, wherein the instructions for determining whether at least one platform corruption has occurred includes instructions for determining whether a CMOS corruption has occurred.

33. The apparatus of claim 27, wherein the instructions for determining whether at least one platform corruption has occurred further includes instructions for determining whether a thermal error has occurred.

34. The apparatus of claim 27, wherein the instructions for determining whether at least one platform corruption has occurred further includes instructions for determining whether a fan error has occurred.

35. The apparatus of claim 27, wherein the instructions for determining whether at least one platform corruption has occurred further includes instructions for determining whether a smart error has occurred.

36. The apparatus of claim 27, wherein the instructions for determining whether at least one platform corruption has occurred further includes instructions for determining whether a memory error has occurred.

37. The apparatus of claim 27, wherein the instructions for determining whether at least one platform corruption has occurred further includes instructions for determining whether a voltage error has occurred.

38. The apparatus of claim 27, wherein the instructions for determining whether at least one platform corruption has occurred further includes instructions for determining whether a voltage regulator has occurred.

39. The apparatus of claim 27, wherein the instructions for evaluating the contents of a diagnostics indicator further include instructions for retrieves the contents of the diagnostics indicator from a boot register.

* * * * *